US012220901B2

(12) United States Patent
Winterowd et al.

(10) Patent No.: US 12,220,901 B2
(45) Date of Patent: Feb. 11, 2025

(54) RAPIDLY PRESSING MIXTURES OF PAPER AND PLASTIC TO TARGETED THICKNESS AND DENSITY

(71) Applicant: Continuus Materials Intellectual Property, LLC, The Woodlands, TX (US)

(72) Inventors: Jack G. Winterowd, Puyallup, WA (US); Kasey Fisher, Philadelphia, PA (US); Matthew Spencer, Palatine, IL (US); Marko Suput, Lompoc, CA (US)

(73) Assignee: CONTINUUS MATERIALS INTELLECTUAL PROPERTY, LLC, The Woodlands, TX (US)

( * ) Notice: Subject to any disclaimer, the term of this patent is extended or adjusted under 35 U.S.C. 154(b) by 110 days.

(21) Appl. No.: 18/298,639

(22) Filed: Apr. 11, 2023

(65) Prior Publication Data

US 2024/0165939 A1     May 23, 2024

Related U.S. Application Data

(60) Provisional application No. 63/426,656, filed on Nov. 18, 2022.

(51) Int. Cl.
*B27N 3/02* (2006.01)
*B27N 3/00* (2006.01)
(Continued)

(52) U.S. Cl.
CPC .............. *B32B 37/04* (2013.01); *B27N 3/002* (2013.01); *B27N 3/007* (2013.01); *B27N 3/02* (2013.01);
(Continued)

(58) Field of Classification Search
CPC .......... B27N 3/00; B27N 3/002; B27N 3/007; B27N 3/02; B27N 3/04; B27N 3/08;
(Continued)

(56) References Cited

U.S. PATENT DOCUMENTS

| 5,824,246 A * | 10/1998 | Reetz | B27N 3/086 |
| | | | 425/384 |
| 6,322,737 B1 * | 11/2001 | Beyer | B29C 48/07 |
| | | | 264/109 |

(Continued)

FOREIGN PATENT DOCUMENTS

| EP | 3 838 589 A1 | 6/2021 |
| EP | 4 039 435 A1 | 8/2022 |

OTHER PUBLICATIONS

Foreign Search Report on EP dtd Apr. 8, 2024.

*Primary Examiner* — Michael A Tolin
(74) *Attorney, Agent, or Firm* — FOLEY & LARDNER LLP (57) ABSTRACT

A method may include pressing a mat including a blend of paper and plastic fragments by applying a pressure to the mat using a heated press such that the mat is compressed to a first thickness, where the pressure is greater than a critical pressure threshold such that at least a portion of a moisture content of the mat is in a super-heated liquid state. The method may include maintaining the pressure on the mat above the critical pressure threshold until at least a portion of the plastic fragments of the mat are melted. The method may include decreasing the pressure on the mat below the critical pressure threshold such that the mat expands to a second thickness greater than or equal to a target thickness, and such that the portion of the moisture content of the mat in the super-heated liquid state is converted to steam.

16 Claims, 5 Drawing Sheets

(51) Int. Cl.
  *B27N 3/10* (2006.01)
  *B27N 3/20* (2006.01)
  *B27N 3/24* (2006.01)
  *B29C 35/16* (2006.01)
  *B29C 43/58* (2006.01)
  *B29K 105/26* (2006.01)
  *B32B 27/20* (2006.01)
  *B32B 29/00* (2006.01)
  *B32B 37/04* (2006.01)
  *B32B 37/10* (2006.01)
  *B32B 37/24* (2006.01)
  *E04C 2/20* (2006.01)
  *E04D 3/35* (2006.01)
  *E04D 12/00* (2006.01)
  *B29L 7/00* (2006.01)

(52) U.S. Cl.
  CPC .............. *B27N 3/10* (2013.01); *B27N 3/203* (2013.01); *B27N 3/24* (2013.01); *B29C 35/16* (2013.01); *B32B 27/20* (2013.01); *B32B 29/005* (2013.01); *B32B 37/1054* (2013.01); *B32B 37/24* (2013.01); *E04C 2/20* (2013.01); *E04D 3/35* (2013.01); *E04D 12/002* (2013.01); *B29C 2043/5808* (2013.01); *B29C 2043/5816* (2013.01); *B29C 2043/5825* (2013.01); *B29K 2105/26* (2013.01); *B29L 2007/002* (2013.01); *B32B 2250/05* (2013.01); *B32B 2250/40* (2013.01); *B32B 2260/028* (2013.01); *B32B 2260/046* (2013.01); *B32B 2264/04* (2013.01); *B32B 2264/062* (2013.01); *B32B 2272/00* (2013.01); *B32B 2305/70* (2013.01); *B32B 2419/06* (2013.01)

(58) Field of Classification Search
  CPC . B27N 3/086; B27N 3/10; B27N 3/12; B27N 3/14; B27N 3/20; B27N 3/203; B27N 3/24; B29B 17/0042; B29C 35/049; B29C 35/16; B29C 43/003; B29C 43/14; B29C 43/146; B29C 43/203; B29C 43/26; B29C 43/265; B29C 43/305; B29C 43/32; B29C 43/52; B29C 2043/5808; B29C 2043/5816; B29C 2043/5825; B29K 2105/26; B29L 2007/002; B32B 27/00; B32B 27/06; B32B 27/08; B32B 27/10; B32B 27/12; B32B 27/20; B32B 27/32; B32B 37/04; B32B 37/06; B32B 37/08; B32B 37/10; B32B 37/1054; B32B 37/24; B32B 2264/04; B32B 2264/06; B32B 2264/062; B32B 2264/065; B32B 2272/00; B32B 2305/70; B32B 2419/00; B32B 2419/06; E04C 2/10; E04C 2/16; E04C 2/20; E04C 2/24; E04C 2/246; E04D 3/35; E04D 12/00; E04D 12/002
  See application file for complete search history.

(56) References Cited

U.S. PATENT DOCUMENTS

| | | | |
|---|---|---|---|
| 2015/0152650 A1* | 6/2015 | Cernohous | B32B 27/20 428/116 |
| 2018/0266112 A1 | 9/2018 | Kelly | |
| 2018/0272558 A1* | 9/2018 | Kalwa | B27N 3/002 |
| 2021/0189732 A1* | 6/2021 | Rayman, Jr. | E04D 13/16 |

* cited by examiner

RAPIDLY PRESSING MIXTURES OF PAPER AND PLASTIC TO TARGETED THICKNESS AND DENSITY

CROSS-REFERENCE TO RELATED PATENT APPLICATION

This application claims the benefit under 35 U.S.C. § 119(e) of U.S. provisional application No. 63/426,656, entitled "RAPIDLY PRESSING MIXTURES OF PAPER AND PLASTIC TO TARGETED THICKNESS AND DENSITY," filed Nov. 18, 2022, which is incorporated herein by reference in its entirety.

BACKGROUND

The manufacture of some materials, such as composite boards, involves consolidating mats of materials in a press. Presses used for this purpose may be heated to high temperatures to facilitate the rapid consolidation of the mats of materials. Large amounts of power are needed to heat the presses used to consolidate the mats of materials.

SUMMARY

Aspects of the present disclosure relate to a method including pressing a mat comprising a blend of paper and plastic fragments. The pressing process includes applying a pressure to the mat using a heated press such that the mat is compressed to a first thickness, where the pressure is greater than a critical pressure threshold such that at least a portion of a moisture content of the mat is converted to a super-heated liquid state. The process further includes maintaining the pressure on the mat above the critical pressure threshold until at least a portion of the plastic fragments of the mat are melted and decreasing the pressure on the mat below the critical pressure threshold such that the mat expands to a second thickness greater than or equal to a target thickness, and such that the portion of the moisture content of the mat in the super-heated liquid state is converted to steam.

The conversion of the moisture content in the mat to steam depends upon the pressure applied to the mat, allowing for precise control of a timing of the conversion of the water to steam by controlling the pressure the press applies to the mat.

The method may also include maintaining the first thickness greater than an elastic limit thickness associated with the target thickness until at least the portion of the plastic fragments of the mat are melted.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The current disclosure solves a technical problem of the high energy requirements for consolidating mats of materials. The current disclosure offers a technical improvement of lower energy requirements and shorter press times as compared to conventional methods. By maintaining pressure on the mat greater than a critical pressure threshold value such that water in the mat remains in a super-heated state, the mat can be consolidated faster and with less energy compared to conventional methods. Decreasing pressure on the mat to below the critical pressure threshold once plastic fragments in the mat are in a molten state allows the super-heated water to convert to steam, drawing heat from the mat. This rapid conversion of water in the mat into steam lowers the temperature of the mat, further shortening cold press times required to consolidate the mat at a target thickness. Additionally, less energy is required to cool platens in a cold press to consolidate the mat compared to conventional methods. Delaying the conversion of water in the mat until after plastic fragments in the mat are in a molten state allows for faster consolidation of mats with less energy expended compared to conventional methods. The conversion of the water in the mat to steam depends upon the pressure applied to the mat, allowing for precise control of the timing of the conversion of the water to steam by controlling the pressure the press applies to the mat.

Figure 1:
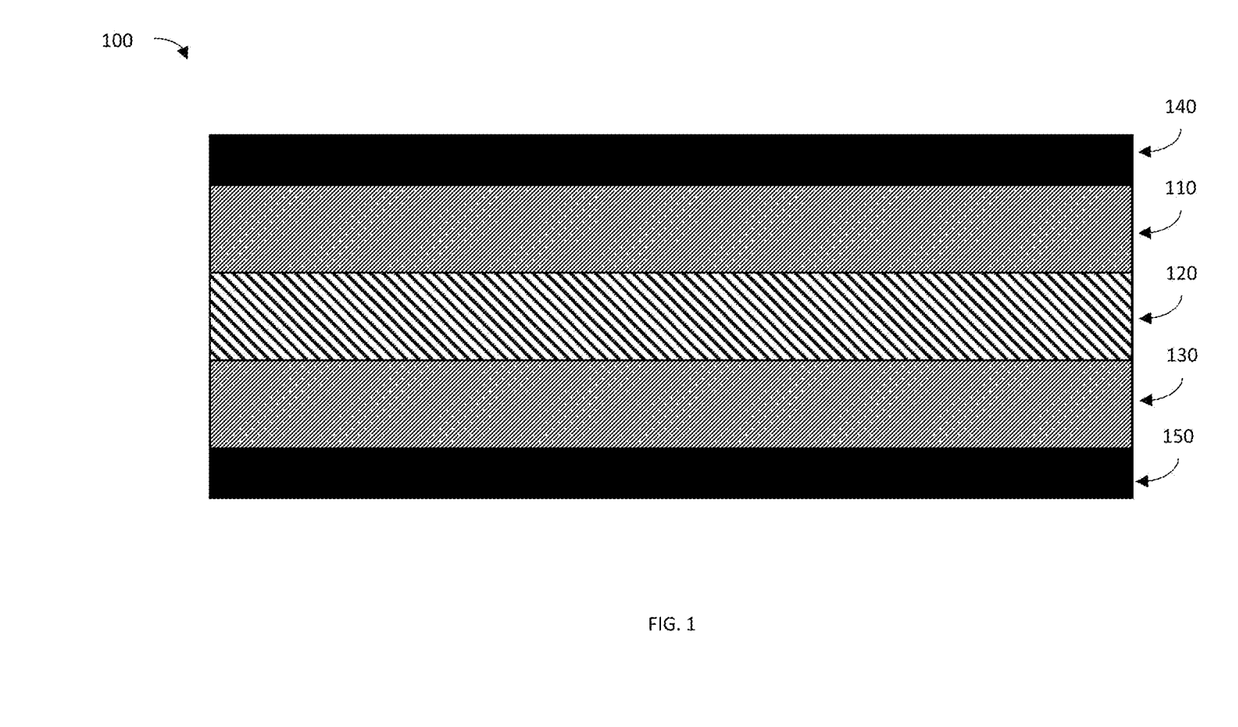
FIG. 1 is an example mat including cellulosic elements and plastic elements in accordance with one or more embodiments.

FIG. 1 is an example mat 100 including cellulosic elements and plastic elements, in accordance with one or more embodiments. Cellulosic elements can include wood, cotton, grass (including bamboo), flax, jute, kenaf, hemp, ramie, pulp fibers derived from various plants, rayon fibers, cellulose esters and other derivatives, paper, and other cellulose-based materials. The size and shape of the cellulosic elements can vary substantially, however, in most cases, the size of the cellulosic elements will be less than that of the eventual composite panel that is being manufactured. Cellulose elements can include paper fragments. Plastic elements can include thermoplastic elements. Plastic elements can also include mixtures of thermoplastic and thermoset plastics, which generally do not melt. Alternatively, plastic elements can include mixtures of thermoplastic materials, wherein one or more of the thermoplastic materials has a melt-point that is less than processing temperatures discussed herein. Thermoplastic elements can include polyethylene, polypropylene, copolymers of ethylene and propylene, polystyrene, acrylonitrile, styrene butadiene resins, and plasticized polyvinyl chloride. The size and shape of the plastic elements can vary substantially. A size of the plastic elements may be less than a size of the eventual composite panel that is being manufactured. Thermoplastic elements can include plastic fragments.

Paper fragments may be made by milling larger pieces of paper until the disintegrated material passes a screen with a particular mesh size. Paper subjected to the milling process may be newspaper, advertising, office paper, packaging, or other paper products. The paper may be virgin material, or it may be recycled or sourced from waste streams. Generating paper fragments from waste or recycling streams has the advantage of being low cost and helps to resolve a world-wide sustainability problem. In some embodiments, the paper fragments have a thickness and diameter of less than about 0.020". Plastic fragments can include polypropylene, polystyrene, polyester, nylon, rubber (natural and synthetic), polyvinyl chloride, polyethylene (including LLDPE, LDPE, MDPE, HDPE), copolymers of ethylene and propylene, and other commercial plastics. In some embodiments, polyethylene-based plastics, especially low and medium density polyethylene resins, are preferred. The plastic fragments can be a mixture of different types of polymers. In addition to polymers, the plastic fragments can also contain plasticizers, such as dioctyl phthalate or benzyl butyl phthalate, colorants, stabilizers, preservatives, and other functional additives. Plastic fragments can be prepared by milling larger pieces of plastic. The plastic can be virgin film material, or it can be recycled or sourced from waste streams (e.g., films, packaging, or a wide array of plastic articles). Generating plastic fragments from waste or recycling streams has the advantage of being low cost and helps to resolve a world-wide sustainability problem. In some embodiments, plastic fragments having a thickness and a diameter of less than about 0.020" are preferred.

In some embodiments, individual fragments may contain both paper and plastic. For instance, many packaging materials found in waste streams include alternating paper and plastic layers. In some cases, these packaging materials can also include a layer of aluminum foil or a film that has been metalized on one surface. Fragments derived from all these materials are suitable for embodiments of this disclosure.

The mat 100 may be formed by depositing elements or mixtures of elements directly onto a conveyor belt, screen, fabric, or some other substrate that is suitable for receiving and accumulating elements. Alternatively, elements may be deposited onto the bottom surface layer 150, such as paper or a polymer film. In some embodiments, a forming substrate into which elements are deposited may be stationary, such as a forming box. In other embodiments, the forming substrate may be moving, such as a belt on a conveyor. In some embodiments, the mat 100 may be formed as a single homogenous layer. In other embodiments, mats may be formed in two or more layers.

The mat 100 may include a core layer 120 including paper fragments and plastic fragments. In some embodiments, the mat 100 may include a top layer 110 and/or a bottom layer 130. In some embodiments, the top layer 110 and the bottom layer 130 may have identical compositions of paper fragments and plastic fragments. In other embodiments, the top layer 110 and the bottom layer 130 may have paper fragments and plastic fragments of the same sizes or different sizes than the paper fragments and plastic fragments of the core layer 120. In some embodiments, the top layer 110 and the bottom layer 130 may have the same paper/plastic ratio or a different paper/plastic ratio than the core layer 120. In some embodiments, the mat may include a top surface layer 140 and/or a bottom surface layer 150. The top surface layer 140 and the bottom surface layer 150 may be paper, polymer film, nonwoven fiberglass, or another material. The example mat 100 may be consolidated using heat and pressure, as discussed herein. The mat 100 may be pressed between hot platens with a particular combination of dwell time, temperature, and pressure to thermally consolidate the mat such that a targeted panel density and thickness are achieved. During consolidation, the mat 100 may absorb heat and components of the mat may undergo phase changes, such as the melting of plastic fragments.

The mat 100 may have an initial mat thickness, initial mat density, and initial moisture content before being pressed. The initial mat thickness, initial mat density, and initial moisture content may be different from a target mat thickness, a target mat density, and a target moisture content, respectively. The mat may be pressed in such a way as to achieve the target mat thickness, the target mat density, and the target moisture content.

A moisture content of the mat 100 can range from about 1-20%. In some embodiments, preferred moisture content values are about 2-10%. In some embodiments, highly preferred moisture content values are about 3-8%. Moisture in the mat 100 prior to hot-pressing can be uniformly distributed throughout the mat, or alternatively, it can be non-uniformly distributed, especially vertically. Higher moisture content values in the mat necessitate use of a longer venting step at an end of the hot-pressing process.

In some embodiments, the mat 100 may include adhesives, water-repellents, colorants, preservatives, insecticides, metal particles, fibers, films, foams, and other materials. In some embodiments, the mat 100 can be formed as a single homogenous mixture. In other embodiments, the mat 100 may be formed with discrete layers. A thickness of the mat 100 may range from about 0.25-20 inches. A basis weight of the mat 100 may range from about 0.2-20 pounds/ft$^2$.

In some embodiments, the mat 100 may be consolidated to form a roof coverboard panel. Subsequent to consolidation, the mat 100 may have exceptional impact resistance, which makes it ideal for roof coverboard applications where resistance to hail is required. Likewise, the consolidated mat can be a flexible panel that can conform to irregular substructures, such as those found along the perimeter of low-slope roofs. Composite panels manufactured in accordance with this disclosure are generally made in a sequence of steps that include mat formation and hot processing. Steps in the manufacturing process may include receiving raw materials, storing, milling, or cutting raw materials to reduce the size of elements that will be incorporated into the mat, drying, screening, blending, pre-pressing, hot-pressing, cold-pressing, finishing, stacking, labeling, grading, packaging, and other steps.

Figure 2:
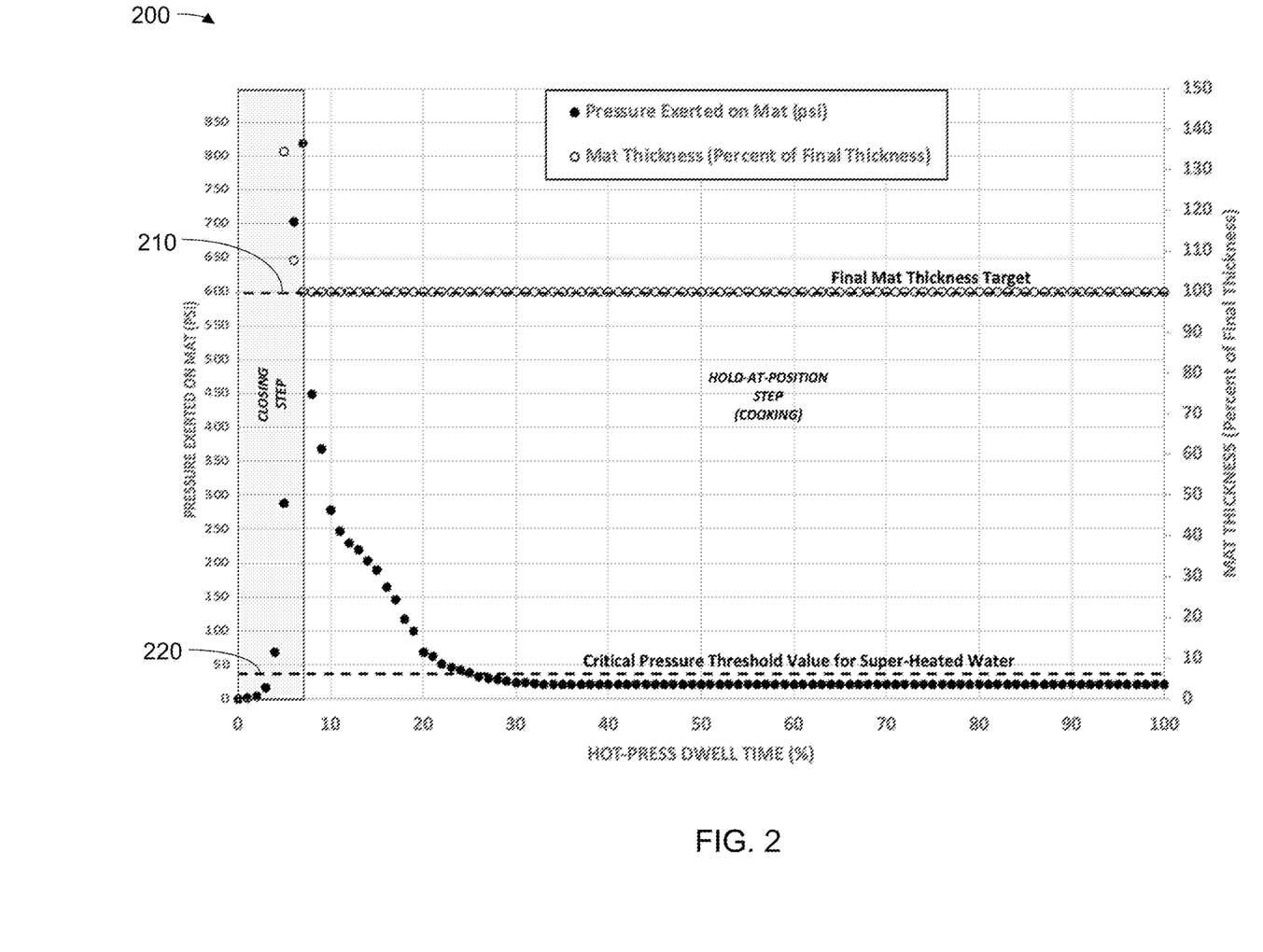
FIG. 2 illustrates an example hot press cycle for consolidating a mat.

FIG. 2 illustrates an example hot press cycle 200 for consolidating a mat. The hot press cycle 200 may be used to consolidate the mat 100 of FIG. 1. A hot press may be used to perform the hot press cycle 200. In some embodiments, the hot press may be a single-opening or a multi-opening press, which both press discrete sections of a mat in batches. In other embodiments, the hot press may be a continuous press. The hot press may include opposing top and bottom platens which apply pressure to the mat throughout the hot press cycle 200. The top and bottom platens may be sufficiently hot to melt at least a portion of thermoplastic elements within the mat after a given dwell time. The hot press cycle 200 may include a target thickness 210 and a critical pressure threshold 220. The target thickness 210 may be a target or desired thickness for the consolidated mat. In some embodiments, the target thickness 210 may be a thickness of a finished product, such as a roof panel coverboard. The target thickness 210 may be associated with a target density. The target density may be equal to a basis weight divided by the target thickness 210.

The hot press cycle 200 may include pressing the mat using a heated press to the target thickness 210 and maintaining the heat and pressure on the mat such that the mat remains at the target thickness 210. The heated press may maintain the mat at the target thickness 210 until the mat is consolidated. In some embodiments, the hot press cycle 200 may include pressing the mat to a reduced thickness less than the target thickness 210 such that the mat absorbs heat from the heated press faster than if the mat were pressed to the target thickness 210. The reduced thickness may be a thickness of the mat which allows the mat to expand to or beyond the target thickness 210 after pressing.

In some embodiments, the mat may be pressed by a cold press after the hot press cycle 200. The cold press may press the mat immediately following the hot press cycle 200. The cold press may cool the mat, causing molten plastic fragments in the mat to congeal and/or solidify. The cold press may compress the mat to the target thickness 210, alleviating excessive spring back after the hot press cycle 200.

The critical pressure threshold 220 may be a pressure threshold above which water in the mat remains in liquid form. The water in the mat may be in a super-heated state when a pressure on the mat exceeds the critical pressure threshold 220. The critical pressure threshold 220 may be a measure of pressure exerted by the hot press. The hot press may heat the mat such that the water in the mat would be converted into steam, except the pressure exerted by the hot press maintains the water in a liquid, super-heated state. However, if the pressure exerted by the hot press drops below the critical pressure threshold 220, the water may convert into steam. Conversion of the water in the mat into steam requires energy, drawing heat from the mat. The conversion of water into steam may slow the heating of the mat, increasing a time required to melt plastic fragments in the mat. A center of the mat may need to reach a threshold temperature for melting the plastic fragments. An increased moisture content of the mat may result in an increased press time required to reach the threshold temperature. The moisture content of the mat may be about 1-8% by weight.

The hot press cycle 200 may include applying pressure to the mat to achieve the target thickness 210. The hot press may maintain the mat at the target thickness 210. However, as components within the mat are deformed, such as plastic fragments melting, a pressure required to maintain the mat at the target thickness 210 decreases. The pressure required to maintain the mat at the target thickness 210 may decrease below the critical pressure threshold 220 such that the water in the mat converts to steam. As discussed above, this conversion of water into steam draws heat from the mat, increasing the required hot press time.

In an example, the mat is subjected to an initial press closing step and then a relatively long "cooking" step in which the mat thickness is held at a constant value equal to the target thickness 210. The applied pressure on the mat is decreased to a value less than the critical pressure threshold 220. Thus, the hot press cycle 200 in this example is associated with steam formation at a relatively early stage of the hot-pressing process. Since the boiling point of water under low pressure is less than the melt-point of the plastic elements, essentially all of the water in the mat is converted to steam before the plastic elements in the mat melt. A cold press cycle following the hot press cycle 200 must cool the mat to congeal the melted plastic elements and consolidate the mat.

Figure 3:
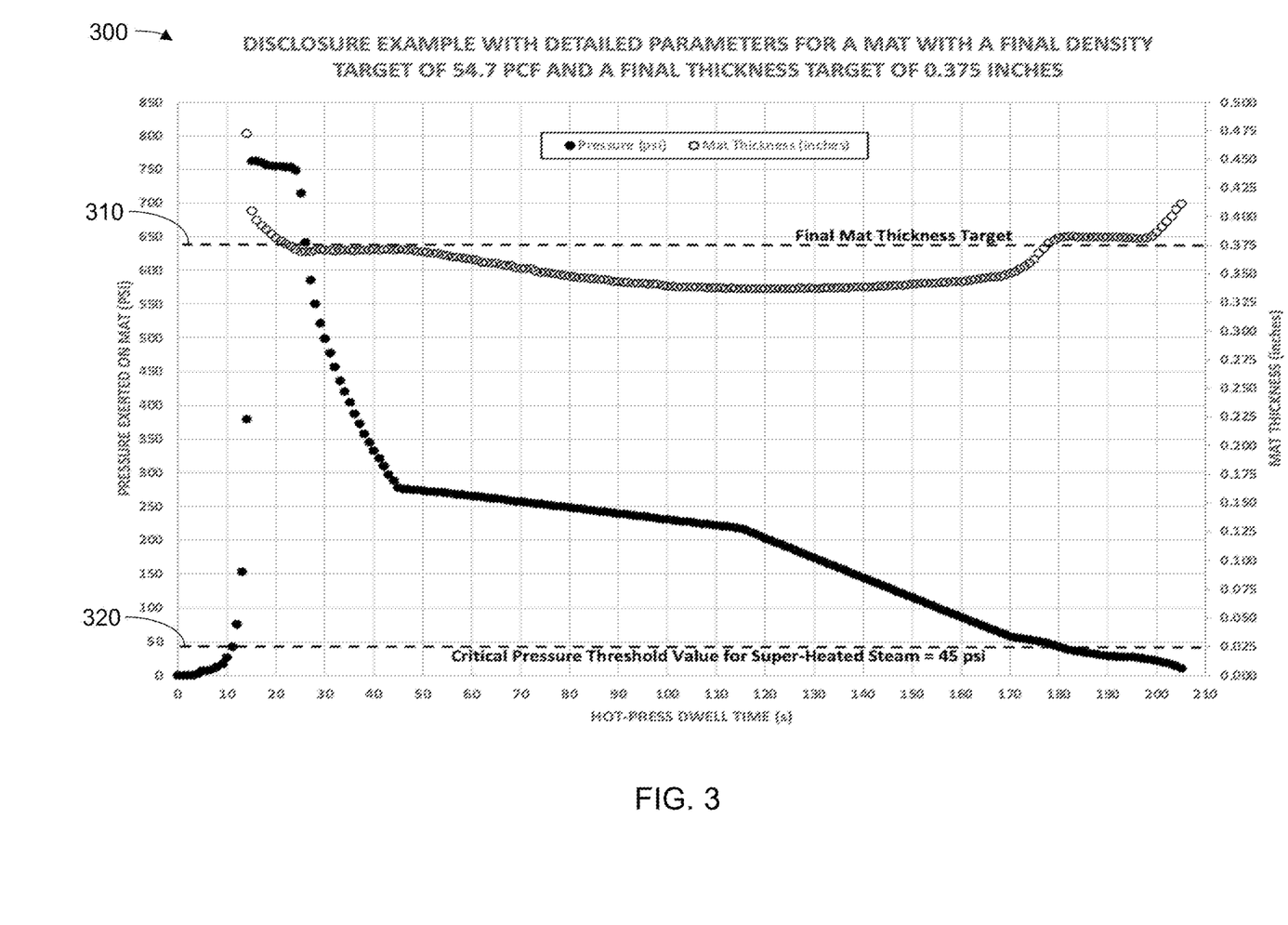
FIG. 3 illustrates another example hot press cycle for consolidating a mat.

FIG. 3 illustrates another example press cycle 300 for consolidating a mat. The hot press cycle 300 may be used to consolidate the mat 100 of FIG. 1. A hot press may be used to perform the hot press cycle 300. In some embodiments, the hot press may be a single-opening or a multi-opening press, which both press discrete sections of a mat in batches. In other embodiments, the hot press may be a continuous press. The hot press may include opposing top and bottom platens which apply pressure to the mat throughout the hot press cycle 300. The top and bottom platens may be sufficiently hot to melt at least a portion of thermoplastic elements within the mat after a given dwell time. The hot press cycle 300 may include a target thickness 310 and a critical pressure threshold 320. The target thickness 310 may be a target or desired thickness for the consolidated mat. In some embodiments, the target thickness 310 may be a thickness of a finished product, such as a roof panel coverboard. The target thickness 310 may be associated with a target density. The target density may be equal to a basis weight divided by the target thickness 310. The critical pressure threshold 320 may be a pressure threshold above which water in the mat remains in liquid form. The critical pressure threshold 320 may be a measure of pressure exerted by the hot press. The critical pressure threshold 320 may be sufficiently high to prevent the water in the mat from boiling. As a mat temperature exceeds a value of about 212° F. during the hot press cycle 300, the applied pressure on the mat can be used to ensure that the moisture exists in a super-heated state. In some embodiments, more than 50% of the moisture in the mat remains in a liquid, super-heated state. In an example, the critical pressure threshold 320 may be about 45 psi. In another example, the, the critical pressure threshold 320 may be about 30-55 psi. In some embodiments, the critical pressure threshold 320 for a mat may be empirically determined.

The hot press cycle 300 may include pressing the mat such that a pressure on the mat exceeds the critical pressure threshold 320 while plastic elements in the mat are melting. Preventing the moisture in the mat from being converted to steam allows a higher percentage of the heat flowing into the mat to be directed towards increasing the mat temperature and melting the plastic elements than if the moisture in the mat were allowed to convert to steam. For example, the pressure on the mat may be maintained above the critical pressure threshold 320 for about 180 seconds. The hot press cycle 300 may include venting the mat by reducing pressure on the mat, allowing the super-heated liquid water in the mat to be converted to steam. The conversion of the water from a liquid state to a gaseous state requires substantial energy, which is spontaneously desorbed from the mat and is associated with a sudden temperature decrease in the mat. The sudden temperature decrease allows the plastic elements in the mat to be congealed faster relative to a mat which does not experience the sudden temperature decrease. Thus, a subsequent cold press cycle following the hot press cycle 300 is relatively short compared to a cold press cycle following a different hot press cycle, such as the hot press cycle 200 of FIG. 2, where the moisture in the mat is allowed to convert to steam while the plastic elements melt. The shorter hot press cycle 200 and the shorter cold press cycle allow for faster production of mats and require lower energy expenditure relative to conventional methods. The conversion of the water in the mat to steam depends upon the pressure applied to the mat, allowing for precise control of the timing of the conversion of the water to steam by controlling the pressure the press applies to the mat. In an example, the conversion of the water to steam may be timed such that the pressure on the mat is reduced, allowing the water to convert to steam upon the plastic elements in the mat reaching a molten state.

In an example, the target thickness 310 is 0.375", the basis weight is 1.71 lb/ft$^2$ (dry), and the target density is 54.7 lb/ft$^3$. Prior to the hot press cycle 300, the mat was composed of paper fragments (57.4%), plastic fragments (37.6%), and moisture (5.0%) by weight. Prior to pressing, the mat had a thickness of about 3.0 inches. During the hot press cycle 300, the press opened rapidly at 205 seconds while the pressure on the mat was still about 11 psi. The top and bottom platen temperature of the press was 400° F. and the core temperature of the mat after 205 seconds of hot-press dwell time was about 330° F., which was sufficiently high to yield excellent bond strength in the finished panel after cold-pressing. In this example, the critical pressure threshold value for the mat is about 45 psi.

In some embodiments, the mat may be vented by rapidly opening the hot press. A pressure when the press is rapidly opened may be less than the critical pressure threshold 320 to avoid release of internal steam pressure which may structurally damage the mat. In an example, the hot press may be opened when the pressure on the mat is 20 psi.

Figure 4:
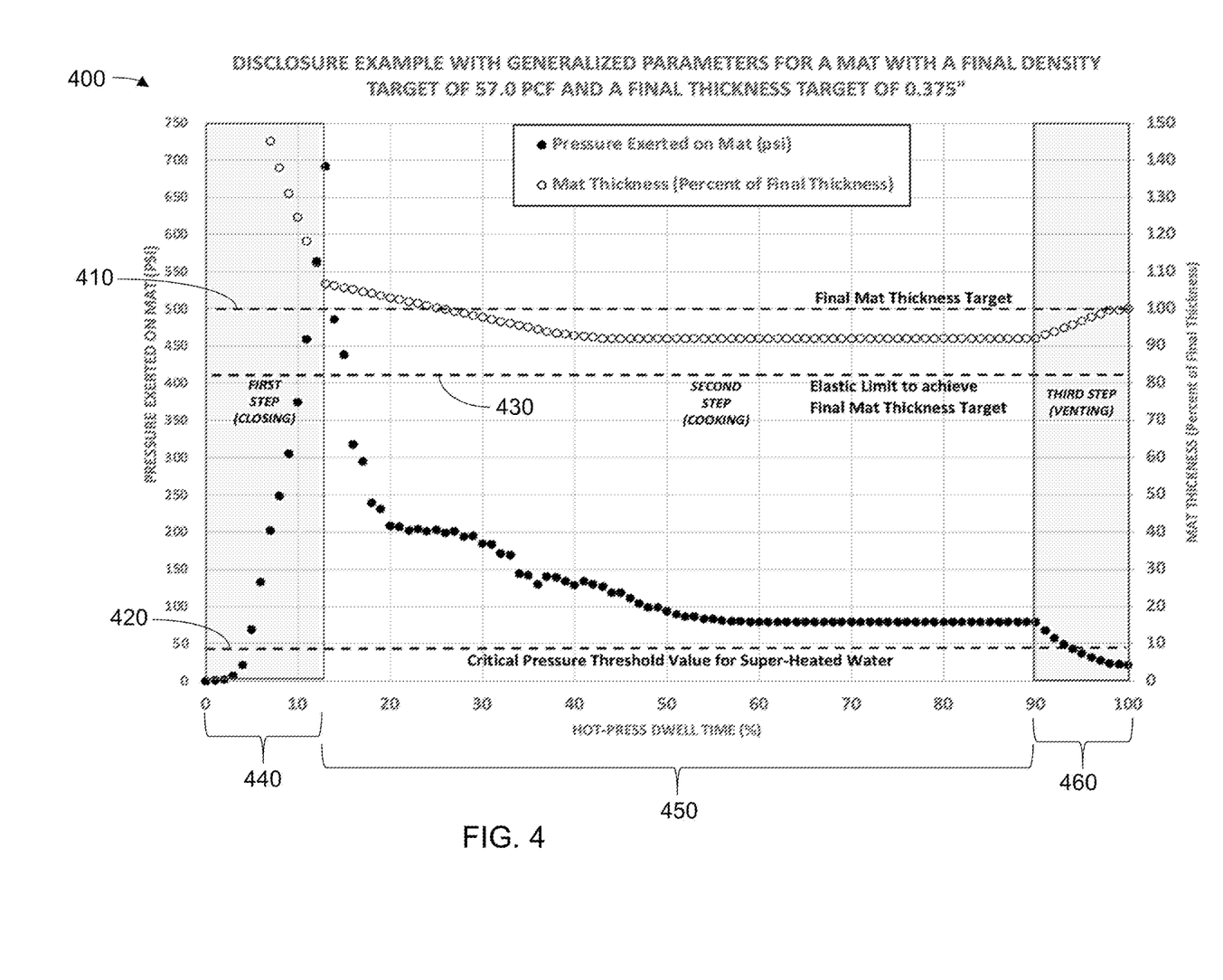
FIG. 4 illustrates another example hot press cycle for consolidating a mat.

FIG. 4 illustrates another example hot press cycle 400 for consolidating a mat. The hot press cycle may include a thickness target 410. The hot press cycle 400 may be used to consolidate the mat 100 of FIG. 1. A hot press may be used to perform the hot press cycle 400. In some embodiments, the hot press may be a single-opening or a multi-opening press, which both press discrete sections of a mat in batches. In other embodiments, the hot press may be a continuous press. The hot press may include opposing top and bottom platens which apply pressure to the mat throughout the hot press cycle 400. The top and bottom platens may be sufficiently hot to melt at least a portion of thermoplastic elements within the mat after a given dwell time. The hot press cycle 400 may include a target thickness 410 and a critical pressure threshold 420. The target thickness 410 may be a target or desired thickness for the consolidated mat. In some embodiments, the target thickness 410 may be a thickness of a finished product, such as a roof panel coverboard. The target thickness 410 may be associated with a target density. The target density may be equal to a basis weight divided by the target thickness 410. The critical pressure threshold 420 may be a pressure threshold above which water in the mat remains in liquid form. The critical pressure threshold 420 may be a measure of pressure exerted by the hot press. The critical pressure threshold 420 may be sufficiently high to prevent the water in the mat from boiling. As a mat temperature exceeds a value of about 212° F. during the hot press cycle 400, the applied pressure on the mat can be used to ensure that the moisture exists in a super-heated state. In some embodiments, more than 50% of the moisture in the mat remains in a liquid, super-heated state. In an example, the critical pressure threshold 420 may be about 45 psi. In another example, the, the critical pressure threshold 420 may be about 30-55 psi. In some embodiments, the critical pressure threshold 420 for a mat may be empirically determined. The critical pressure threshold 420 may depend upon the paper and plastic fragments included in the mat. Interactions between the paper and plastic fragments and the moisture content of the mat may cause the critical pressure threshold 420 to be different than a critical pressure value associated with wood-based composite manufacturing.

The hot press cycle 400 may include an elastic compression limit 430. The elastic compression limit 430 may be a thickness of the mat which, if reached, does not allow the mat to expand to the target thickness 410. Thus, if the mat is compressed to a thickness greater than the elastic compression limit 430, the mat can expand to be equal to or greater than the target thickness 410. If the mat is compressed to a thickness less than the elastic compression limit 430, the mat cannot expand to be equal to or greater than the target thickness 410. The mat may be pressed in a cold press after the hot press cycle 400 to congeal the plastic elements in the mat and compress the mat to the target thickness 410. To achieve the target thickness 410, the mat must not be compressed to a thickness less than the elastic compression limit 430. This puts constraints on the pressure exerted by the hot press on the mat. If the pressure is too high, the mat will be smaller than the target thickness 410. If the pressure is too low, the moisture in the mat may be converted to steam while the plastic elements are melting, requiring greater time and energy to melt the plastic elements.

The hot press cycle 400 may include a closing step 440. The closing step 440 may include closing the hot press on the mat such that an initial pressure applied by the hot press to the mat rises from 0 psi to an initial pressure. In an example, the initial pressure is about 100 psi. In the closing step 440, the mat may be compressed from an initial thickness. In some embodiments, the mat may be compressed in the closing step 440 to less than about 30% of the initial thickness. The closing step 440 may include compressing the mat such that the mat is not compressed to a thickness below the elastic compression limit 430. The thickness of the mat is maintained above the elastic compression limit for the duration of the hot press cycle 400 such that the target thickness 410 can be reached. In some embodiments, the thickness of the mat at the end of the closing step 440 may be about 90-120% of the target thickness 410. The closing step 440 may end when a maximum pressure is reached. In some embodiments, the maximum pressure may be about 100 psi, 500 psi, 750 psi, 1,000 psi, or greater. In an example, a mat with an initial height of 3.0 inches, a targeted final thickness of 0.375", and a basis weight of 1.82 lb/ft$^2$ is subjected to a hot-pressing event such that the pressure exerted on the mat starts at 0 psi and increases to 730 psi over a period of 25 seconds, which yields a mat thickness value of 0.395" (compared to a target thickness of 0.375" and a total hot press dwell time of 150 s). In this example, the closing step 440 takes 25 seconds (16.7% of the hot press cycle 400), involves a maximum pressure of 730 psi, and achieves a minimum panel thickness that is 105.3% of the target thickness 410 and 13.2% of the initial mat thickness. In some embodiments, the closing step 440 may be about 7-35% of the hot press cycle 400.

The hot press cycle 400 may include a cooking step 450. The cooking step 450 may begin as soon as the pressure on the mat decreases from the maximum pressure. The pressure on the mat may decrease due to relaxation events in the mat, such as glass transitions and melting events. The relaxation events may reduce an ability of the mat to resist compressive forces. If the maximum pressure were maintained, the mat would be compressed below the elastic compression limit 430. The relaxation events cause the mat to resist compression less such that less pressure is needed to compress the mat to a particular thickness. During the cooking step 450, the pressure exerted on the mat is sufficiently reduced such that the thickness of the mat stays above the elastic compression limit 430, but the pressure must simultaneously remain above the critical pressure threshold 420. The pressure on the mat is maintained above the critical pressure threshold 420 in order to prevent the moisture content of the mat from converting to steam. Preventing the moisture in the mat from being converted to steam allows a higher percentage of heat flowing into the mat to be directed towards increasing the mat temperature and melting the plastic elements than if the moisture in the mat were allowed to convert to steam. In some embodiments, less than 50% of the moisture content of the mat may yet convert to steam during the cooking step. All or a portion of the plastic elements of the mat may be converted to a molten state (melted) during the cooking step 450. The cooking step 450 may last until a predetermined portion of the plastic elements in the mat have melted. In some embodiments, the cooking step 450 lasts until a threshold portion of the plastic elements in the mat have melted. The mat may be subjected to a cold press cycle to realize bond formation and thickness dimensional stability. In some embodiments, the majority of the plastic elements in the mat are low-density polyethylene and the cooking step may end when the core of the mat reaches a temperature greater than about 300° F. In some embodiments, the cooking step 450 may be more than about 70% of the hot press cycle 400.

In an example, a mat with a target thickness of 0.375" begins the cooking step 450 with a pressure of 730 psi and a thickness of 0.395". Over the course of the cooking step 450, which takes 110 seconds, the mat thickness is reduced to 0.345" and the pressure is reduced to 60 psi and is never less than 45 psi, the critical pressure threshold 420. In this example, the cooking step 450 takes 73.3% of the total hot-press time and achieves a minimum panel thickness that is 92% of a final panel target thickness, which is greater than the elastic compression limit 430 and the target thickness 410.

The hot press cycle 400 may include a venting step 460. The venting step may include gradually reducing the pressure on the mat below the critical pressure threshold 420. In some embodiments, the critical pressure threshold may be about 45 psi. In other embodiments, the critical pressure threshold may be about 30-55 psi. As the pressure on the mat drops below the critical pressure threshold 420, the super-heated water in the mat will be converted to steam, reducing the temperature of the mat. The pressure the press exerts on the mat may be controlled, allowing for precise control of a timing of the conversion of the water in the mat to steam by controlling the pressure the press applies to the mat. Energy for converting the water to steam is spontaneously acquired from the mat, as the conversion of super-heated water to steam is an endothermic process. In some embodiments, steam may be primarily released from edges of the mat. Reducing the pressure on the mat gradually may cause the venting step 460 to take place over 5-15 seconds or longer. Reducing the pressure on the mat gradually may result in the gradual release of steam from the mat, avoiding damage to the mat caused by a sudden release of steam. In an example, if large amounts of steam are formed and released over a very short period of time, such as 0.1 seconds, then significant damage to the mat structure can occur. During the venting step 460, as the pressure on the mat is reduced, the mat may expand. By the end of the venting step 460 and the end of the hot press cycle 400, the mat expands to greater than or equal to the target thickness 410. In some embodiments, the venting step may be about 5-15% of the hot press cycle 400. In some embodiments, the hot press may be rapidly opened at the end of the venting step 460, ending the hot press cycle 400. The hot press cycle 400 may be followed by a cold press cycle which compresses the mat to the target thickness 410 and congeals the melted plastic elements in the mat, realizing bond formation. The reduction in the temperature of the mat due to the formation of steam may allow the cold press cycle to be shorter than if the venting step 460 did not take place.

A thickness of the mat at the end of the venting step 460 may be used to determine a thickness recovery parameter of the mat. The thickness recovery parameter may describe how much the mat expands after being compressed. The thickness recovery parameter may be specific to a specific mat composition. Thickness recovery parameters for various mat compositions may be calculated or empirically determined. The thickness recovery parameter may be used to determine the elastic compression limit 430.

Figure 5:
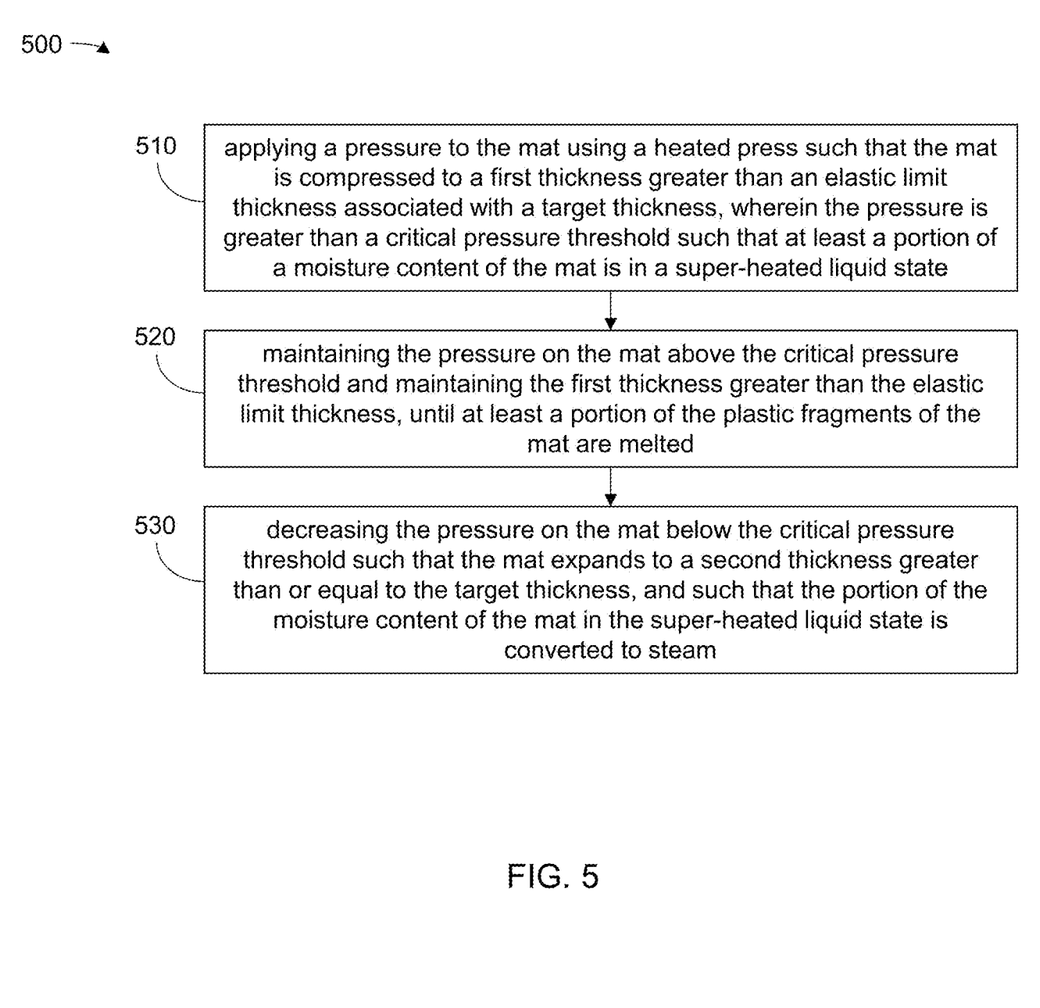
FIG. 5 is a flowchart illustrating operations in a method for consolidating a mat.

FIG. 5 is a flowchart 500 illustrating operations in a method for consolidating a mat. The method may include additional, fewer, or different operations than illustrated. Furthermore, the operations illustrated may be performed in the order shown, in a different order, or concurrently. In some embodiments, the method may be performed on the mat 100 of FIG. 1.

At 510, pressure is applied to the mat using a heated press such that the mat is compressed to a first thickness greater than an elastic limit thickness associated with a target thickness, wherein the pressure is greater than a critical pressure threshold such that at least a portion of a moisture content of the mat is in a super-heated state. The elastic limit thickness is the minimum thickness for which the mat can be compressed under pressure such that the mat expands to the target thickness when the pressure on the mat is eliminated. If the mat is compressed to a thickness less than the elastic limit thickness, then the mat may not be able to expand to equal to or greater than the target thickness. The critical pressure threshold may be a pressure at which the moisture content, as heated by the heated press, remains in a super-heated liquid state. In this condition, the moisture in the mat exists as a liquid at a temperature that is greater than 212° F.

At 520, the pressure on the mat is maintained above the critical pressure threshold and the first thickness is maintained greater than the elastic limit thickness until at least a portion of the plastic fragments of the mat are melted. Maintaining the pressure above the critical pressure threshold maintains the portion of the moisture content in a super-heated liquid state, preventing steam formation. Preventing steam formation prevents a heat from the heated press from being used to convert the moisture content to steam, allowing the heat to melt the plastic fragments. This allows for faster melting of the plastic fragments than if the moisture content were allowed to convert to steam. The first thickness is maintained greater than the elastic limit thickness so that the mat can expand to equal to or greater than the target thickness.

At 530, the pressure on the mat is decreased below the critical pressure threshold such that the mat expands to a second thickness greater than or equal to the target thickness, and such that the portion of the moisture content of the mat in the super-heater liquid state is converted to steam. The pressure the press exerts on the mat may be controlled, allowing for precise control of a timing of the conversion of the water in the mat to steam by controlling the pressure the press applies to the mat. The conversion of the portion of the moisture content of the mat to steam draws heat from the mat, cooling the mat. The mat may be subsequently pressed in a cold press to compress the mat to the target thickness and congeal the plastic fragments. The cooling of the mat caused by the conversion of the portion of the moisture content to steam may allow the cold press cycle to be shorter than if the cooling of the mat had not occurred, resulting in time and energy savings.

INDUSTRIAL APPLICABILITY

A method may include forming a mat, wherein the mat includes cellulosic elements, plastic elements, and water and has an initial thickness and dry basis weight, and consolidating the formed mat in a hot-press in a sequential three-step process to make a hot mat with a thickness value that is equal to or greater than the targeted final thickness value and a density value that is equal to or less than the targeted final density value. The first step of hot-pressing involves applying pressure to the mat such that the thickness of the mat is compressed to a value that is less than 30% of the initial mat thickness value and greater than the mat elastic limit thickness value. The second step of the hot-pressing process involves applying sustained pressure on the mat that is always greater than the critical pressure threshold value, while simultaneously maintaining the mat thickness at a value that is greater than the mat elastic limit thickness value, melting plastic elements within the mat, and converting water in the mat to a super-heated state. The third step of hot-pressing involves reducing pressure on the mat such that super-heated water in the mat is converted to steam and the thickness of the mat increases to a value that is equal to or greater than the targeted final thickness value.

The method may include computing the mat elastic limit thickness value by dividing the dry basis weight of the mat by the dry mat density value at the elastic limit and multiplying the quotient by unit conversion factors, wherein the dry mat density value at the elastic limit is computed by first subtracting 21.0 from the final mat density target value and then dividing this difference by 0.513, wherein the density values are expressed in units of $lb/ft^3$.

The method may include wherein the mat elastic limit thickness value is about 15% less than the value computed by dividing the dry basis weight of the mat by the dry mat density value at the elastic limit and multiplying the quotient by unit conversion factors, wherein the dry mat density value at the elastic limit is computed by first subtracting 21.0 from the final mat density target value and then dividing this difference by 0.513, wherein the density values are expressed in units of $lb/ft^3$.

The method may include wherein the critical pressure threshold value is in the range of about 30-60 psi.

The method may include wherein the critical pressure threshold value is in the range of about 35-50 psi.

The method may include the mat including paper fragments.

The method may include the mat including plastic fragments.

The method may include wherein the mat has a moisture content value in the range of about 1-20% prior to hot-pressing.

The method may include wherein the mat has a moisture content value in the range of about 2-10% prior to hot-pressing.

The method may include wherein the dry basis weight of the mat is in the range of about 1.0-15.0 $lb/ft^2$.

The method may include wherein the mat includes paper fragments and the level of the paper fragments in the mat is in the range of about 10-90% on a dry basis.

The method may include wherein the mat includes paper fragments and the level of the paper fragments in the mat is in the range of about 30-80% on a dry basis.

The method may include wherein the mat includes plastic fragments and the level of the plastic fragments in the mat is in the range of about 10-70% on a dry basis.

The method may include wherein the mat includes plastic fragments and the level of the plastic fragments in the mat is in the range of about 20-60% on a dry basis.

The method may include wherein the targeted final mat thickness value is in the range of about 0.10-6.00 inches.

The method may include wherein the targeted final mat thickness value is in the range of about 0.10-1.50 inches.

The method may include wherein the targeted final mat density value is in the range of about 44-70 $lb/ft^3$.

The method may include wherein the temperature of the opposing platens is greater than about 300° F.

The method may include wherein the temperature of the opposing platens is greater than about 350° F.

The method may include wherein the temperature of the opposing platens is greater than about 400° F.

A method including forming a mat, wherein the mat includes cellulosic elements, plastic elements, and water and has an initial thickness and dry basis weight, and consolidating the formed mat in a hot-press in a sequential three-step process to make a hot mat with a thickness value that is equal to or greater than the targeted final thickness value and a density value that is equal to or less than the targeted final density value, and subsequently cold-pressing the hot mat to make a cold mat with a thickness value that is equal to the targeted final thickness value and a density value that is equal to the targeted final density value, wherein the first step of hot-pressing involves applying pressure to the mat such that the thickness of the mat is compressed to a value that is less than 30% of the initial mat thickness value and greater than the mat elastic limit thickness value, wherein the second step of the hot-pressing process involves applying sustained pressure on the mat that is always greater than the critical pressure threshold value, while simultaneously maintaining the mat thickness at a value that is greater than the mat elastic limit thickness value, melting plastic elements within the mat, and converting water in the mat to a super-heated state, wherein the third step of hot-pressing involves reducing pressure on the mat such that super-heated water in the mat is converted to steam and the thickness of the mat increases to a value that is equal to or greater than the targeted final thickness value.

A composite panel manufactured using a method including forming a mat, wherein the mat includes cellulosic elements, plastic elements, and water and has an initial thickness and dry basis weight, and consolidating the formed mat in a hot-press in a sequential three-step process to make a hot mat with a thickness value that is equal to or greater than the targeted final thickness value and a density value that is equal to or less than the targeted final density value, wherein the first step of hot-pressing involves applying pressure to the mat such that the thickness of the mat is compressed to a value that is less than 30% of the initial mat thickness value and greater than the mat elastic limit thickness value, wherein the second step of the hot-pressing process involves applying sustained pressure on the mat that is always greater than the critical pressure threshold value, while simultaneously maintaining the mat thickness at a value that is greater than the mat elastic limit thickness value, melting plastic elements within the mat, and converting water in the mat to a super-heated state, wherein the third step of hot-pressing involves reducing pressure on the mat such that super-heated water in the mat is converted to steam and the thickness of the mat increases to a value that is equal to or greater than the targeted final thickness value.

A composite panel manufactured using a method including forming a mat, wherein the mat includes cellulosic elements, plastic elements, and water and has an initial thickness and dry basis weight, and consolidating the formed mat in a hot-press in a sequential three-step process to make a hot mat with a thickness value that is equal to or greater than the targeted final thickness value and a density value that is equal to or less than the targeted final density value, and subsequently cold-pressing the hot mat to make a cold mat with a thickness value that is equal to the targeted final thickness value and a density value that is equal to the targeted final density value, wherein the first step of hot-pressing involves applying pressure to the mat such that the thickness of the mat is compressed to a value that is less than 30% of the initial mat thickness value and greater than the mat elastic limit thickness value, wherein the second step of the hot-pressing process involves applying sustained pressure on the mat that is always greater than the critical pressure threshold value, while simultaneously maintaining the mat thickness at a value that is greater than the mat elastic limit thickness value, melting plastic elements within the mat, and converting water in the mat to a super-heated state, wherein the third step of hot-pressing involves reducing pressure on the mat such that super-heated water in the mat is converted to steam and the thickness of the mat increases to a value that is equal to or greater than the targeted final thickness value.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The invention claimed is:
1. A method comprising:
pressing a mat comprising a blend of paper and plastic fragments, wherein the pressing comprises:
applying a pressure to the mat using a heated press such that the mat is compressed to a first thickness, wherein the pressure is greater than a critical pressure threshold such that at least a portion of a moisture content of the mat is in a super-heated liquid state;

maintaining the pressure on the mat above the critical pressure threshold until at least a portion of the plastic fragments of the mat are melted; and decreasing the pressure on the mat below the critical pressure threshold such that the mat expands to a second thickness greater than or equal to a target thickness, and such that the portion of the moisture content of the mat in the super-heated liquid state is converted to steam.

2. The method of claim 1, wherein the first thickness is greater than an elastic limit thickness associated with the target thickness, and further comprising maintaining the first thickness greater than the elastic limit thickness until at least the portion of the plastic fragments of the mat are melted.

3. The method of claim 1, wherein the first thickness is less than 30% of an initial mat thickness.

4. The method of claim 1, wherein the pressure and a heat from the heated press cause the portion of the plastic fragments to melt, wherein the portion of the plastic fragments is at least 50% of the plastic fragments.

5. The method of claim 1, wherein the portion of the moisture content comprises at least 50% of the moisture content.

6. The method of claim 1, further comprising pressing the mat using a cold platen such that the mat is compressed to the target thickness value.

7. The method of claim 1, wherein the critical pressure threshold value is in the range of about 30-60 psi.

8. The method of claim 1, wherein the mat has a moisture content value in the range of about 1-20% prior to hot-pressing.

9. The method of claim 1, wherein maintaining the pressure on the mat above the critical pressure threshold comprises maintaining the pressure such that a mat density value is equal to a targeted final density value, and wherein decreasing the pressure on the mat below the critical pressure threshold comprises decreasing the pressure on the mat such that the mat density value is equal to or less than the targeted final density value.

10. The method of claim 9, further comprising pressing the mat using a cold platen such that the mat density value is equal to the targeted final density value.

11. A method comprising:

pressing a mat comprising a blend of paper and plastic fragments, wherein the pressing comprises:

applying a pressure to the mat using a heated press such that the mat is compressed to a first density, wherein the pressure is greater than a critical pressure threshold such that at least a portion of a moisture content of the mat is in a super-heated liquid state;

maintaining the pressure on the mat above the critical pressure threshold until at least a portion of the plastic fragments of the mat are melted; and decreasing the pressure on the mat below the critical pressure threshold such that the mat expands to a second density less than or equal to a target density, and such that the portion of the moisture content of the mat in the super-heated liquid state is converted to steam.

12. The method of claim 11, wherein the pressure and a heat from the heated press cause the portion of the plastic fragments to melt, wherein the portion of the plastic fragments is at least 50% of the plastic fragments.

13. The method of claim 11, wherein the portion of the moisture content comprises at least 50% of the moisture content.

14. The method of claim 11, further comprising pressing the mat using a cold platen such that the mat is compressed to the target density.

15. The method of claim 11, wherein the critical pressure threshold value is in the range of about 30-60 psi.

16. The method of claim 11, wherein the mat has a moisture content value in the range of about 1-20% prior to hot-pressing.

* * * * *